Aug. 15, 1967 G. E. COMSTOCK, 3D 3,336,583

DEFORMABLE MAGNETIZABLE DISC MOUNTED ON CYLINDER

Filed May 17, 1963

INVENTOR.
GEORGE E. COMSTOCK, 3d

BY

Douglas M. Clarkson

ATTORNEY 3,336,583

DEFORMABLE MAGNETIZABLE DISC MOUNTED ON CYLINDER

George E. Comstock 3d, Huntington, N.Y., assignor to Potter Instrument Company, Inc., Plainview, N.Y., a corporation of New York Filed May 17, 1963, Ser. No. 281,168
7 Claims. (Cl. 340—174.1)

This invention relates to random access magnetic recording apparatus and, more particularly, relates to the random access magnetic recording apparatus utilizing direct contact between the read/write head and the magnetic surface during and only during information transfer.

Storage of data in the form of digital information recorded in the form of magnetized bits on a magnetizable surface has been of increased importance particularly to the computer art. To reduce access time, it has been found desirable to use a plurality of individual storage elements, thus, to enable reaching the desired element without reading all prior elements. In this way, it is possible to obtain access to the information recorded in a storage device without having to proceed through the entire stored information to reach the position at which the information desired is stored.

Rigid elements, such as rigid discs, have been used. However, the dimensional tolerances of the surface are very high to prevent deviations in surface flatness from resulting in error in information transfer. Any deviation from flatness when traversed by a contact type of read/write head causes amplitude modulation of the signal being read out and often introduces erroneous read out. Further, contact types of heads have introduced wear of the head and surface.

Flexible discs have been used with separated read/write heads. For example, read/write heads separated from the discs by aerodynamics and hydrodynamics have become popular. A review of several types is set forth in the Proceedings of the IRE, volume 49, No. 1, January 1961, pages 164–174.

However, the separation distance between the read/write head and the recording medium inevitably reduces the information packing density from the desired high levels.

It is, therefore, the primary object of this invention to provide a random access magnetic recording device in which the read/write head is positioned in contact with the recording medium during and only during information transfer.

It is a further object of this invention to provide a random access memory in which the dimensional accuracy of the recording surface is not required to be maintained to the same tolerances as now necessary.

It is a further object of this invention to provide a random access memory in which storage at high packing densities can be had without adversely affecting the instrument life.

In accordance with these objects, there is provided, in a preferred embodiment of this invention, a magnetic recording drum consisting of a generally cylindrical body portion having an open end with a flexible, disc-shaped membrane stretched across the open end. At least the outer surface of the membrane is coated with a suitable magnetic material. The cylinder is mounted for rotation about the central axis thereof and a read/write head is positioned adjacent the coated surface and spaced therefrom by a preselected small clearance. During information transfer, air pressure is applied to the interior of the cylinder, thereby to deform the recording disc axially, bringing it out into proximity with or into contact with the read/write head. With the cessation of information transfer, the air pressure may be reduced, permitting the disc to return to its normal position separated from the head.

In accordance with another embodiment of this invention, the drum may comprise two cylinders placed back to back, each of which is provided with means for applying air pressure to the interior thereof.

A plurality of magnetic recording drums are mounted on a single frame to compose a memory storage bank. For example, the drums may be mounted on the periphery of a rotatable frame which may be indexed to the desired drum for access. Thus, information may be recorded sequentially on the drums. For access to any of the information, however, the frame may be indexed to the desired position for access to the drum containing the desired information.

Having briefly described this invention, it will be described in greater detail now, along with other objects and advantages, in the following portions of the specification, which may best be understood by reference to the accompanying drawings, of which:

Figure 1:
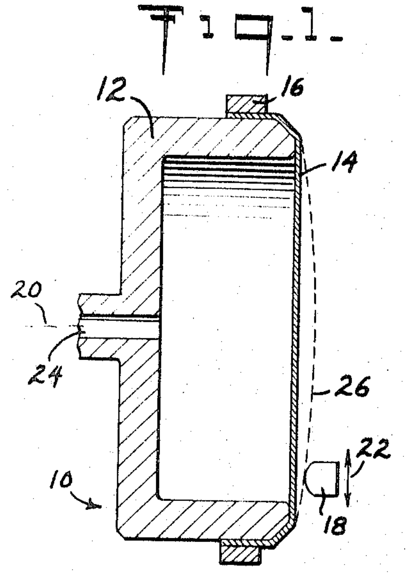
FIG. 1 is a sectional view of a memory drum constructed in accordance with the present invention.

In FIG. 1, there is shown a magnetic recording drum 10 consisting of a generally cylindrical body portion 12 having an open end. A disc 14 of a deformable plastic membrance coated with a magnetizable surface is stretched across the open end and is held in position by suitable means such as an annular ring 16.

A read/write head 18 is supported moveably by any desired structure presently known and is separated from the surface of the disc 14 by a preselected distance, such as 0.001 inch, for example. The drum 10 is rotated about its central axis 20, and the head 18 is tracked along predetermined paths such as concentric circles or a helix over the disc 14, as indicated by arrow 22.

A central aperture 24 is provided in the drum 10 so that, when it is desired to record a signal on the magnetic disc 14, air or any other suitable gas is pumped into the interior of the drum 10, thereby deforming the disc recording medium axially bringing it out into contact with the head 18, as indicated by the dotted line 26. While any suitable means may be used to rotate the drum 10, a plurality of vanes (not shown) may be formed in the aperture 24 to provide rotation.

When the information is recorded, the air pressure is removed, and the disc 14 will return to its non-contacting position. Thus, there is no wear of the recording medium or of the recording head when the information is not actually being recorded or transcribed.

Similarly, to read out the information, the drum 10 is pressurized as described above. When pressurized, the disc will contact the head 18 again to develop a playback signal, which is amplified and detected in the usual manner. Any of the conventional recording techniques, such as the single channel high density serial-serial technique, may be used.

It will be noted that since the head 18 and the magnetic surface of the disc 14 are not in contact except when information is being transferred, the life of both is extended. Since the disc 14 is flexible and is brought into contact with the head 18 by air pressure, the tolerance with regard to flatness of the recording surface is relatively unimportant as compared with a solid non-deforming recording medium. However, during information transfer, the disc 14 makes contact with the head 18 thereby enabling higher packing densities to be reached.

In many cases, it is desired to use a double-sided construction. In such applications, the construction shown in FIG. 2 may be employed advantageously.

Figure 2:
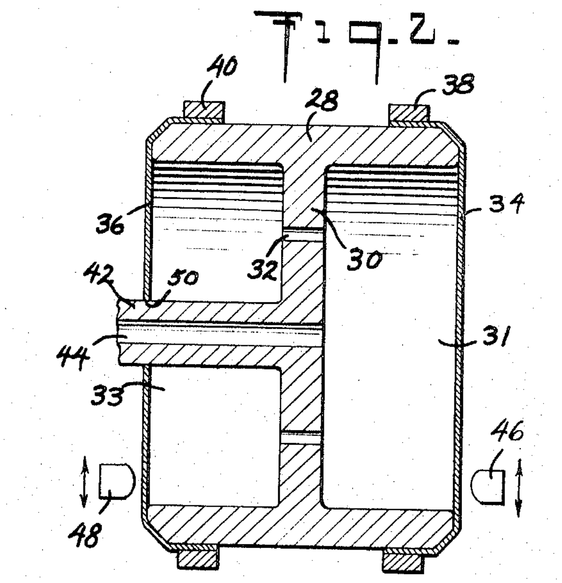
FIG. 2 is a sectional view of another embodiment of the drum of the present invention.

In FIG. 2, there is shown a generally cylindrical structure forming a drum 28 supported by a central web 30 having a plurality of apertures 32 pierced therethrough. A disc 34 of magnetically coated plastic material is stretched across one end of the double ended drum 28, and a similar disc 36 is stretched across the other end, the discs 34 and 36 being held respectively by clamps 38 and 40.

A central shaft 42 having an axially extending opening 44 is provided for rotation of the drum and to communicate with the interior chamber 31 for the introduction of air pressure internally. The apertures 32 communicate the same pressure in the chamber 31 to the chamber 33. Heads 46 and 48 are provided for traversing the discs 34 and 36 in a manner similar to that described above.

Since rotation of the drum 28 about its axis is required, the shaft 42 is brought through a central circular aperture 50 in the recording disc 36. This aperture 50 is pierced so as to encircle the shaft with a small clearance so that air leakage under the pressurized condition is minimized.

Figure 3:
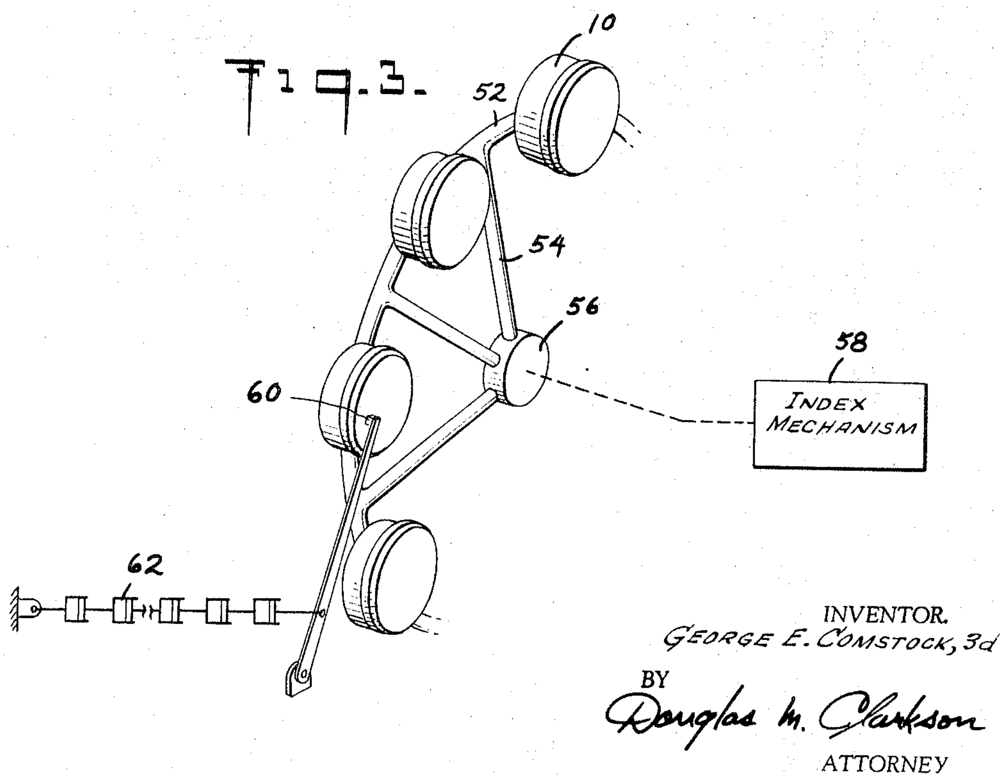
FIG. 3 is a perspective view of a magnetic memory bank utilizing the drums shown in FIG. 1.

Several drums may be mounted on a single shaft, or alternatively, as shown in FIG. 3, a plurality of drums may be rotatably mounted on a frame formed by an annular, hollow rim 52 carried by hollow spokes 54 on a central hub 56. Each drum 10, preferably, is mounted rotatably on the rim 52.

An indexing mechanism 58 is connected to the hub 56 to index the frame so that a drum carrying the selected information is placed adjacent the head 60. Similarly, the head 60, preferably, is quickly indexed radially of the drum by any suitable indexing mechanism such as, for example, a plurality of fluid-operated cylinders 62, thereby enabling the head 60 to reach the desired record track on the head quickly and without the necessity of sequentially reading of unwanted information in advance of the desired information.

This invention may be modified variously without departing from the scope and spirit of the subjoined claims.

What is claimed is:

1. A recording drum comprising,
   a cylinder having an open end,
   a disc of deformable, magnetizable material stretched over the open end of the cylinder,
   a read/write head positioned adjacent the surface of the disc, and
   means for pressurizing the interior of the cylinder to deform the disc into the information-transferring contact with the head.

2. A recording drum in accordance with claim 1 which includes
   the cylinder having a second open end,
   a second disc of deformable magnetizable material stretched across the second open end of the cylinder, and
   a second read/write head positioned adjacent the surface of the second disc.

3. A recording drum in accordance with claim 1 which includes,
   an axially extending shaft, and
   the shaft being provided with a bore communicating with the interior of the cylinder through which the cylinder may be pressurized.

4. A recording drum in accordance with claim 2 which includes,
   an axially extending shaft for rotational mounting of the recording drum,
   the shaft extending through the second disc and being coupled to the cylinder by an internal web, and
   the shaft being provided with a bore communicating with the interior of the cylinder through which the cylinder may be pressurized.

5. Random access, information storage apparatus comprising,
   a plurality of information storage elements;
   means for moving a selected one of said plurality of information storage elements to an information-transferring position;
   each of the information storage elements comprising:
   an open ended cylinder,
   a disc of a deformable, magnetizable membrane stretched across the open end of the cylinder,
   means for supporting the cylinder for rotation about the axis thereof,
   a read/write head,
   means for moving the head to a selected position along the disc radius and spaced apart from the disc surface, and
   means operable only during information transfer for connecting a fluid pressure to the interior of the cylinder to deform the disc bringing the magnetizable surface into contact with the head.

6. A random access, information storage apparatus comprising,
   a plurality of information storage elements,
   means for moving a selected one of said plurality of information storage elements to an information-transferring position,
   each of the information storage elements comprising:
   a frame,
   a sheet of deformable material having a magnetizable surface mounted on said frame,
   means for rotatably supporting said frame,
   a transducer,
   means for moving said transducer to a selected region of said sheet, and
   means operable only during information transfer for applying a fluid pressure to said sheet to deform said sheet and bring its magnetizable surface into contact with said transducer.

7. A random access, information storage apparatus comprising,
   a plurality of information storage elements,
   a frame including a hub, a hollow rim and hollow spokes interconnecting said hollow rim and said hub,
   means for rotating said frame,
   means for rotatably mounting said storage elements on said rim,
   means to index the frame to position a selected one of the storage elements in an information-transfer position,
   each of said information storage elements comprising:
   an open ended cylinder,
   a disc of deformable magnetizable membrane stretched across the open end of the cylinder,
   a transducer,
   means for moving the transducer to a selected position along the disc radius and spaced apart from the disc surface,
   a fluid pressure source, and
   means including said hollow spokes and said hollow rim for connecting said pressure source to the interior of the cylinder to deform the disc only during information transfer to bring the magnetizable surface into contact with the head.

References Cited

UNITED STATES PATENTS

| | | | |
|---|---|---|---|
| 2,852,761 | 9/1958 | Hagopian | 340—174.1 |
| 3,036,304 | 5/1962 | Willard | 340—174.1 |
| 3,060,433 | 10/1962 | Lee et al. | 179—100.2 |

BERNARD KONICK, *Primary Examiner.*

V. P. CANNEY, *Assistant Examiner.*